Figure 6:
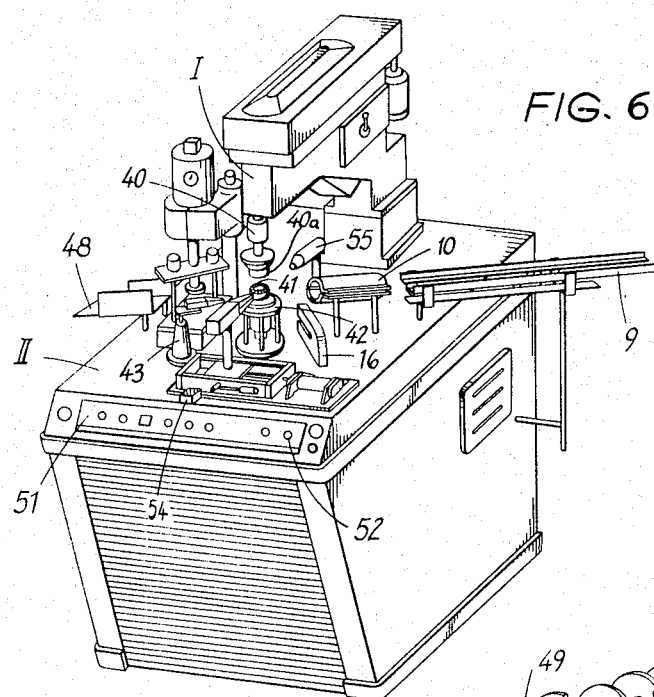

Jan. 31, 1967  M. SCHMIDT  3,301,737
APPARATUS FOR MAKING HOLLOW PLASTIC ARTICLES
Filed Feb. 12, 1965  6 Sheets-Sheet 1
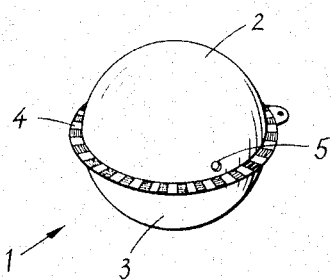
FIG. 1
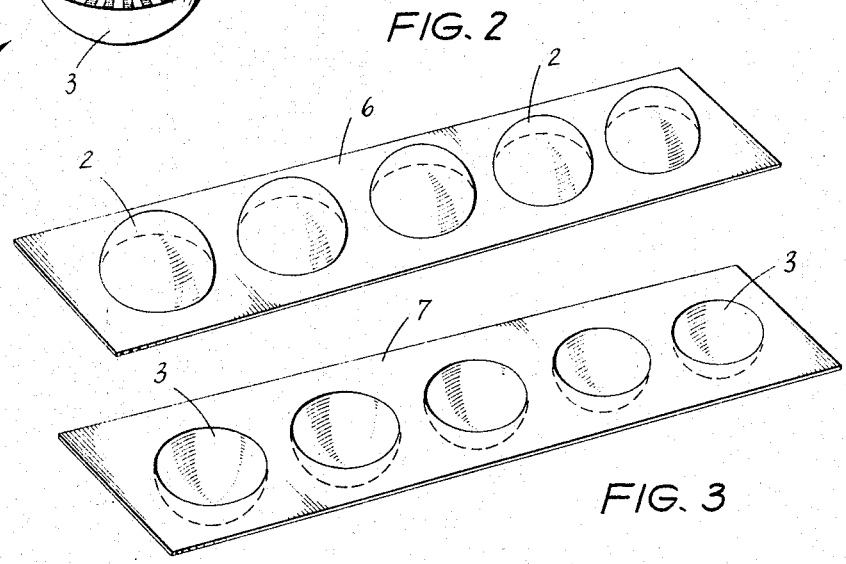
FIG. 2
FIG. 3
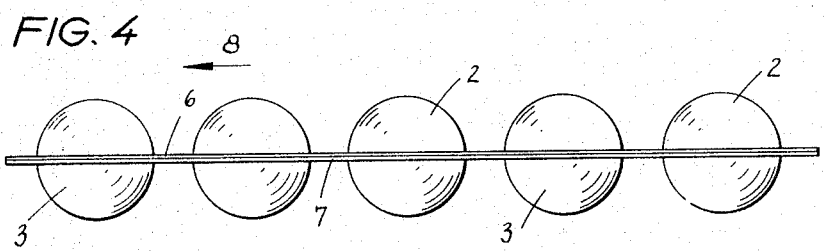
FIG. 4
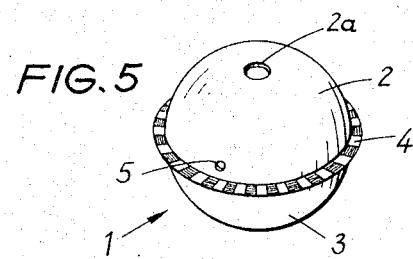
FIG. 5
INVENTOR
MAX SCHMIDT

INVENTOR
MAX SCHMIDT

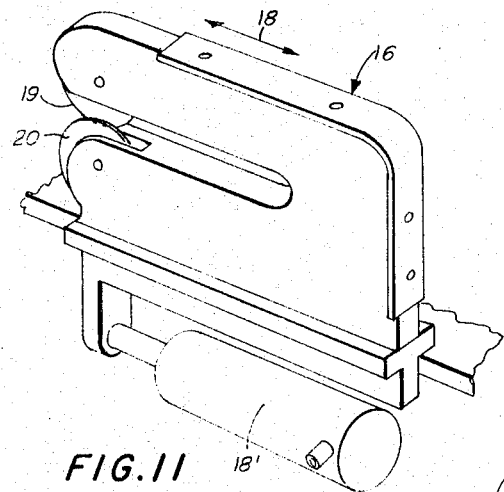
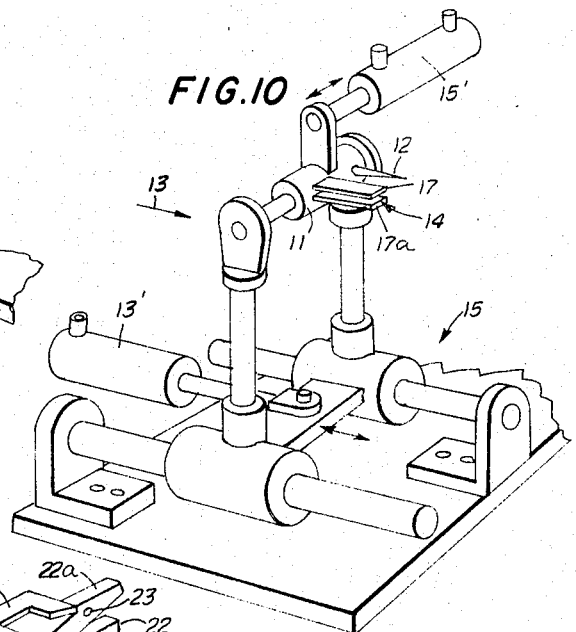
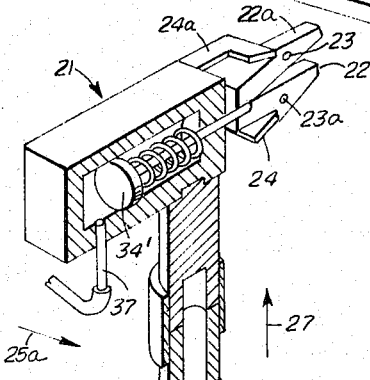
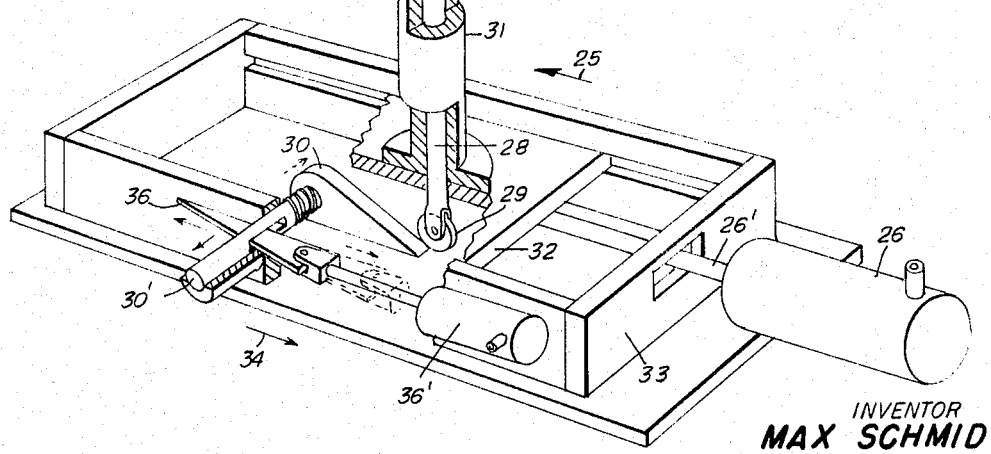

Jan. 31, 1967   M. SCHMIDT   3,301,737
APPARATUS FOR MAKING HOLLOW PLASTIC ARTICLES
Filed Feb. 12, 1965   6 Sheets-Sheet 4

INVENTOR
MAX SCHMIDT

INVENTOR
MAX SCHMIDT

Jan. 31, 1967        M. SCHMIDT        3,301,737
APPARATUS FOR MAKING HOLLOW PLASTIC ARTICLES
Filed Feb. 12, 1965        6 Sheets-Sheet 6

INVENTOR.
MAX SCHMIDT

United States Patent Office 3,301,737
Patented Jan. 31, 1967

3,301,737
APPARATUS FOR MAKING HOLLOW
PLASTIC ARTICLES
Max Schmidt, Brauhausstrasse 17, Ansbach,
Mittelfranken, Germany
Filed Feb. 12, 1965, Ser. No. 446,444
5 Claims. (Cl. 156—511)

The present invention relates to an apparatus for producing hollow articles which preferably consist of a thermoplastic material and each of which is composed of two shell-shaped members or molded parts which are firmly secured to each other, and is a continuation-in-part of application Serial No. 126,766, filed July 6, 1961, now abandoned and of application Serial No. 18,397, filed March 29, 1960, now abandoned.

Such hollow articles may be utilized for many different purposes and especially for ornamental or decorative purposes.

More particularly, the invention relates to the production of Christmas tree balls of plastic, each of which is composed of a pair of half shells having an open end of circular shape.

The conventional manner of producing hollow articles of plastic by connecting two molded shell-shaped parts to each other possesses a series of disadvantages which render the production of such articles very uneconomical. This applies primarily to the manner of connecting the two shell-shaped parts to each other which has previously often been done by high-frequency welding. A high-frequency welding operation, however, is a slow procedure resulting in a low rate of production, and it is also practically impossible with such a method to attain a cleanly welded connection between the two molded parts if such parts have a very small wall thickness.

This deficiency is especially serious if the molded parts consist of a transparent or translucent material. A further difficulty which arises when applying high-frequency welding in the production of hollow articles of plastic, especially Christmas tree balls and the like, consists in the fact that in order to attain the desired narrow welded edge on a Christmas tree ball which should be as little apparent as possible, it is only possible to apply a single welding operation. If several welding operations by high-frequency are carried out on the same workpieces or molded parts, these parts will show irregularities. For example, the edges or rims at one side of the ball will be wide, while those at the other side will be narrow. This may even lead to the result that the edges of the two parts will have such small contact surfaces that the ball will burst if subjected to the least pressure or impact.

It is an object of the present invention to provide a new method of producing hollow articles of plastic which overcomes the disadvantages of the known methods, and is especially adapted for a very economical mass production of such articles since it permits such a production to be carried out almost entirely automatically.

A further object of the invention is to provide a new machine for carrying out the inventive method.

The method of the present invention includes the steps of forming the two parts of the article being made as shapes formed in strips of thermoplastic material having complementary circular configurations at the plane of said strips, placing said strips in face-to-face position with a lubricating material between the strips, cutting the strips to separate the strips into the required coinciding upper and lower shaped parts having outturned edges, and placing these parts with their outturned edges abutting against each other on the lower die of a welding tool. The upper die of this tool then descends and starts to rotate and is lowered so as to rotate the upper part with respect to the lower part to weld the two shaped parts firmly together by the heat of friction and simultaneous pressure between the edges of the parts. The excess of the outturned welded edge or rim is then cut off, whereupon the finished article being made and the waste are ejected from the machine. The present invention, therefore, is based upon the concept of welding the two shells together by means of pressure and frictional heat which softens the thermoplastic material and thus welds the two shells automatically together.

In order to attain really economical results with the new method and to permit an effective mass production it is necessary to adjust the various operating steps and functions so as to be precisely adjusted and timed with respect to each other. Thus, for example, if too much pressure is applied the edges will be crumpled. Obviously, a welding process will then be impossible. On the other hand, if the pressure is too low the frictional heat generated by the relative rotation of the individual parts in engagement with each other will be too low, and a proper welding will not take place. According to another feature of the invention, this difficulty may be overcome by providing corrugations in the edges to be welded together when the upper die is pressed against the lower die. By providing the two annular edges or rims of the elements to be formed with serrations, corrugations, indentations or the like, the two parts, after being heated, will be welded together very securely since the individual serations interengage with and adhere very firmly to each other. A successful performance of the entire welding process, however, depends also upon the proper pressure and the proper speed of relative rotation of the two parts to be welded in order to produce the required frictional heat for attaining a proper weld.

The operation of the method and the machine according to the invention proceeds in such a manner that a workpiece consisting of separate upper and lower parts, each of which is, for example, of a hemispherical shape, are inserted into the welding tool, thereupon the upper part of the tool, which firmly grips the upper part of the workpiece, is rotated at a high speed and is pressed upon the stationary lower tool part carrying the lower workpiece so that the edges or rims of the two parts of the workpiece are rotated relative to each other and are at the same time pressed upon each other so as to produce a high frictional heat which may be increased by the provision of serrations or the like in the rims, with the material of these rims then melting so as to fuse them solidly to each other. In actual practice, it has been found that this welding process will be successful only if at least one of the contact surfaces of the rims of the two plastic shells is provided with a thin coating of a lubricating fluid which prevents the two parts from being welded together only at a few points and insures that the rims will be uniformly welded together at all points of their contact surfaces.

The method and apparatus according to the invention may, of course, be employed not only for producing spherical plastic articles such as Christmas tree balls, but it is also possible to produce hollow articles of any other shape, provided that the edges or rims of the upper and lower parts thereof have a circular shape. For increasing the decorative effect, these parts may also be metallized on one side, preferably on the inside if the plastic of which they are molded is transparent or transparently colored.

A proper welding also requires that the lower part of the welding tool, which during the first part of the welding process is held in a stationary position, is provided with a very accurately adjustable slip clutch so that it will not release the lower part of the welding tool and will not permit the same to be rotated by the rotation of the upper tool part until the plastic material of the two rims has been heated by friction to the softening temperature of the plastic and until the adhesion between the two rims caused by the softening and incipient welding thereof has reached a certain value whereupon the torque of the top workpiece is transmitted to the bottom tool part by adhesion between the two workpieces.

In order to produce such hollow plastic articles by the method as previously described very simply and inexpensively, and in mass production, it is a further object of the invention to provide a machine which permits the various operations to be carried out fully and automatically. This automatic machine according to the invention is capable of automatically controlling all operations of the new method of manufacture from the step of feeding the workpieces to the machine to the steps of ejecting the finished articles and collecting the same in suitable containers. All of these functions are carried out by pneumatic means which, in turn, are controlled by a single camshaft, the cams of which act upon valves which are thus actuated in a timed sequence. The invention further provides a single control wheel which, by being turned toward the right or left, permits all of the operations to be carried out synchronously at different speeds. The hemispherical or other shaped plastic parts will thus be automatically cut from a long strip of plastic sheeting into which they have been molded in a row, and the parts will be automatically welded together in pairs, punched out to the proper rim size and ejected from the machine. The machine is operated by a motor which drives the electrical control elements and the pneumatic means which consist of pneumatic cylinder and piston units which are actuated and controlled by the cams on the above-mentioned camshaft.

Another feature of the invention consists in the provision of a transverse support which is capable of moving transversely as well as longitudinally for feeding the workpieces to the first operating stage of the machine. This support is provided with a gripping finger or the like which passes into a slotted guide tube and engages with strips of plastic therein in which the shapes of a series of articles being made are premolded. The gripping finger feeds these strips from this guide tube to the cutting device which cuts the strips apart to form the pairs of individual workpieces to be welded which are then picked up by a gripping device which intermittently deposits workpieces in the welding tool.

In order to prevent any lasting deformation of the finished plastic article which might be caused by an excessive pressure thereon, it is desirable to provide the hollow plastic article, for example, a Christmas tree ball, with an inconspicuous aperture through which the air may enter into the article so that the air pressure will be equal at the outer and inner sides thereof. This small aperture may be punched into one of the plastic parts to be welded together while they are fed to the cutting device. If the plastic article, for example a Christmas tree ball, is to be hung up it is desirable to provide it with a larger opening into which a suitable hanger may be inserted. This opening is formed in the center of the upper part of the ball by means of an electrically heated cutter which is controlled by a thermostat and operated pneumatically.

Another feature of the invention consists in the provision of a gripping device which grips the workpiece while being severed from the plastic strip by the cutting device, and which then carries the workpiece toward the center of the machine where it is moved vertically upwardly by a control cam or wedge and then moved vertically downwardly as it passes the upper end of the same cam so as to lower the workpiece into the lower die of the welding tool, whereupon the gripping device is immediately opened and withdrawn to release the workpiece. This gripping device is designed according to the invention to carry out the following functions and each of these functions at a speed which may be adjusted by the valves which are acted upon by one of the cams on the camshaft:

(a) Gripping of the workpiece by two movable clamping jaws;
(b) Forward movement in the direction toward the welding tool;
(c) Vertical movement upwardly controlled by the control cam;
(d) Vertical movement downwardly by the same control cam;
(e) Opening of the clamping jaws for releasing the workpiece in the lower die of the welding tool;
(f) Lateral movement of the control cam by means of a slide member to disengage the cam from the gripping device to permit the latter to return to its original position;
(g) Return movement of the gripping device to the original position.

The simple vertical movement of the gripping device in the upward direction is effected by a rod which is guided by a roller along the control cam. The pneumatic piston for producing this movement extends horizontally and is connected to a plate which is slidably guided and carries the gripping device.

The principal unit of the automatic machine, the welding apparatus, consists of an upper part and a lower part, a serrated welding die in each part, an adjustable clutch member in the lower part associated with the lower die that will not permit rotation of the lower part until the torque attains the desired level, and means for driving the upper die at an adjustable speed and for moving it pneumatically upwardly and downwardly and for pressing it during the downward movement and while rotating at a high speed and at an adjustable pressure upon the two parts of the workpiece resting on the stationary lower die so as to produce a high frictional heat between these two parts, the engaging contact surfaces of which are coated with a thin layer of a suitable lubricant and are welded together by the frictional heat and pressure so as to secure the two parts firmly and uniformly at all points of their contact surfaces to each other.

Immediately beyond the welding unit the machine is provided with a further gripping device which is designed so as to withdraw the welded workpiece from the lower die and to deposit it in a punch. This second gripping device carries out vertical upward and downward movements, as well as rotary movements toward the right and left between the welding unit and the punch. These movements are likewise pneumatically controlled by roller-operated lever valves which are acted upon by one of the cams of the camshaft. When the operation of this gripping device is completed and the welded workpiece is deposited thereby in the punch, the latter is operated by compressed air, likewise under control of the camshaft, so as to punch out the workpiece from the flat double flange that surrounds it, and to eject the finished workpiece and the punched-out scrap by compressed air from the punch and deposit them in containers.

The automatic machine according to the invention therefore consists principally of an upper part comprising a rotatable headstock which is movable by pneumatic means in vertical directions and of a lower part forming a box-shaped housing which contains the camshaft with the roller-operated lever valves, the electrical switch elements, the adjustable speed geared motor, the control valve which is adjustable from the outside on a control panel, and the pneumatic elements for operating the individual units of the machine.

In order to insure that the machine will operate safely at all times, suitable safety devices are also provided. Thus, for example, at one end of the guide tube through which the workpiece strip is fed toward the cutting device a feeler-controlled microswitch is mounted which is adapted to interrupt the operation of the cutting device if the workpiece strip is not properly moved. Another safety device, for example, consists of a light barrier which extends transverse to the axial direction of the welding dies and is associated with photoelectric cells which automatically prevent the upper welding die from moving toward the lower die when the latter does not contain a workpiece. It has also been found desirable to provide one or both welding dies with suitable cushioning means for protecting the workpiece.

As already mentioned, the entire machine is preferably designed so as to permit not only the production of round Christmas tree balls but also of other hollow plastic articles of any other shape, for example, an elliptical or onion shape, or even an irregular shape, provided only that the welding rims or edges of the upper and lower parts of these articles are circular.

The foregoing as well as further objects, features and advantages of the present invention will become more clearly apparent from the following detailed description thereof, particularly when the same is read with reference to the accompanying drawings, in which:

FIG. 1 shows a perspective view of a Christmas tree ball which is welded and stamped out by a machine according to the invention, FIGS. 2 and 3 show perspective views of a pair of strips of plastic in which a series of hemispherical parts have been molded and before these strips are fed into the machine.

Figure 8:
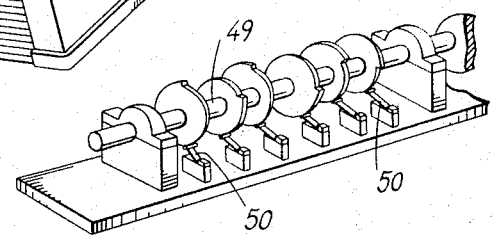
Figure 7:
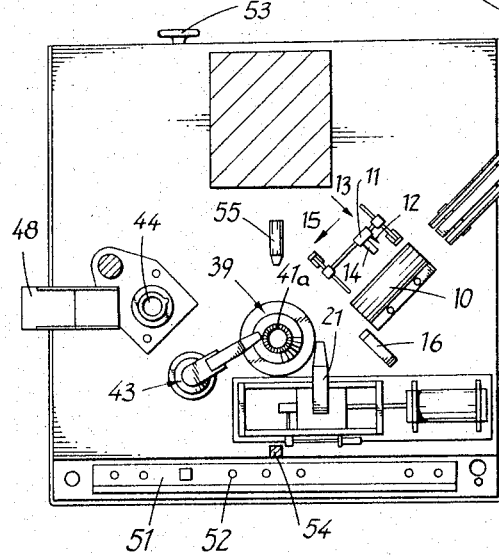
Figure 9:
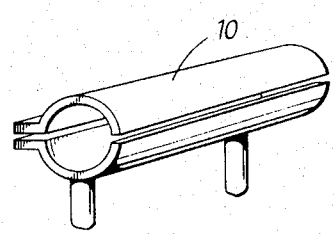
Figure 13:
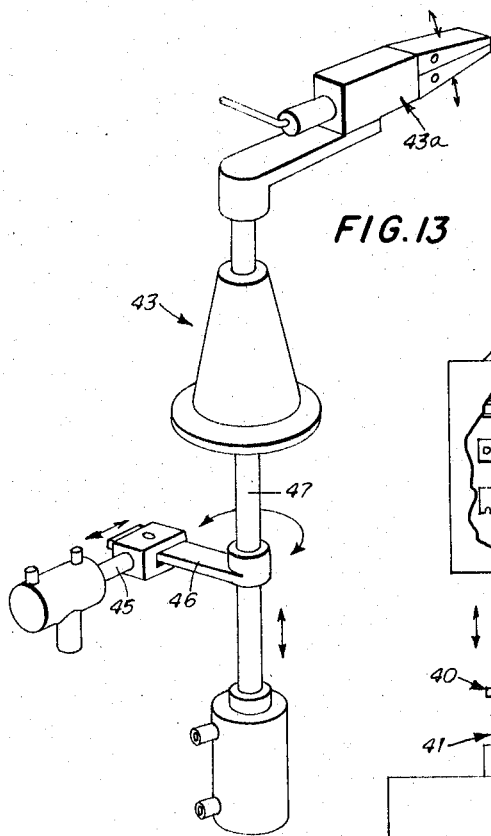
Figure 14:
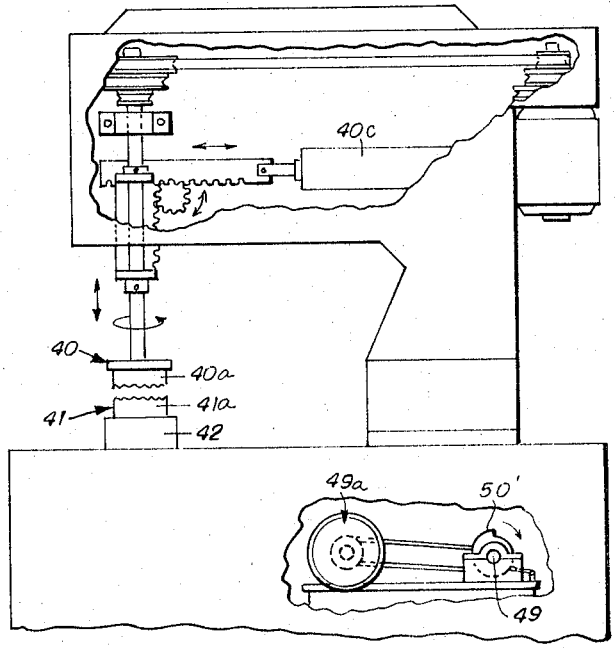
Figure 24:
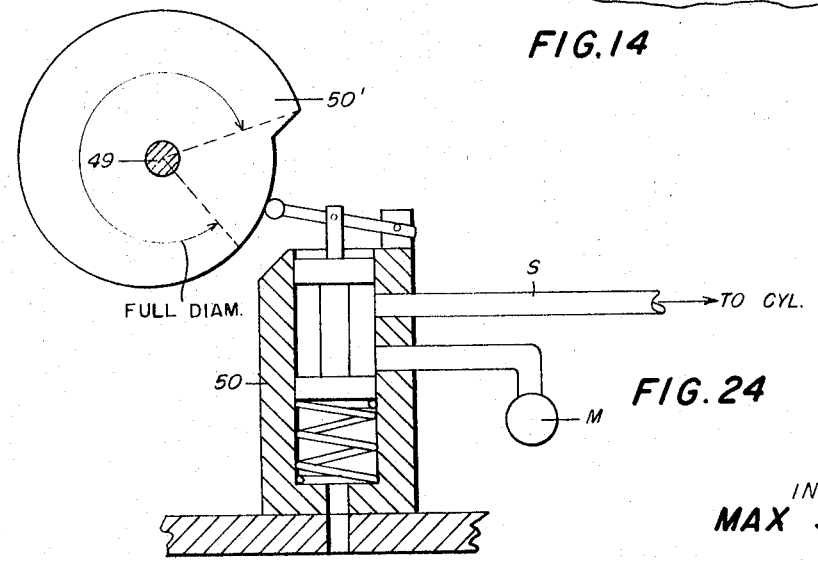
Figure 15:
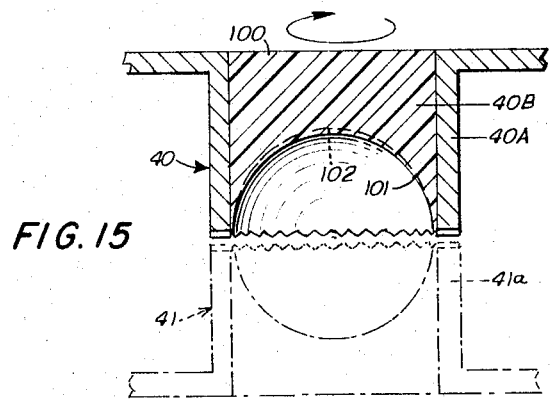
Figure 16:
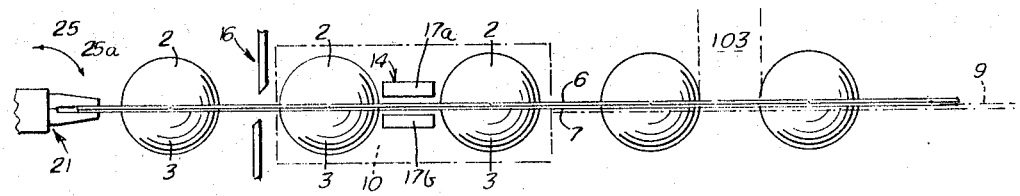
Figure 17:
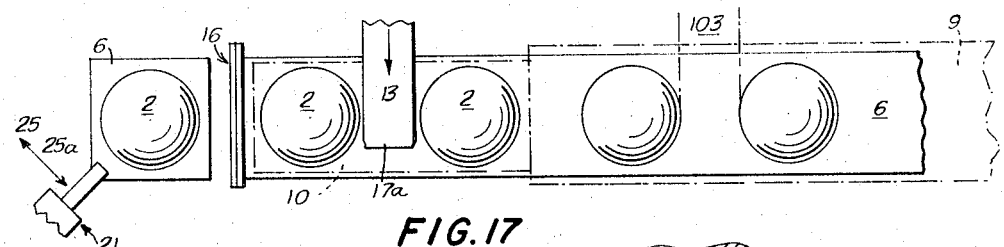
Figure 18:
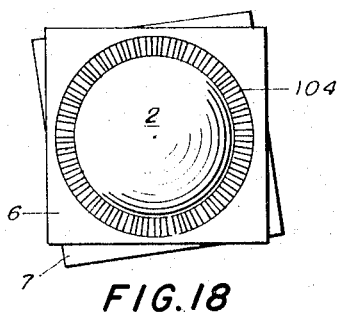
Figure 19:
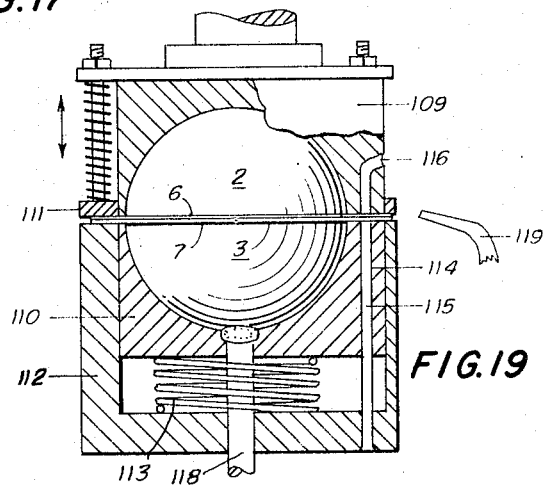
Figure 20:
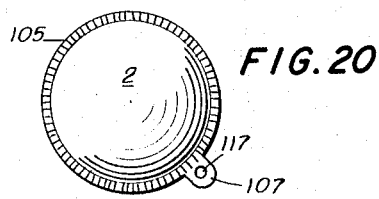
Figure 21:
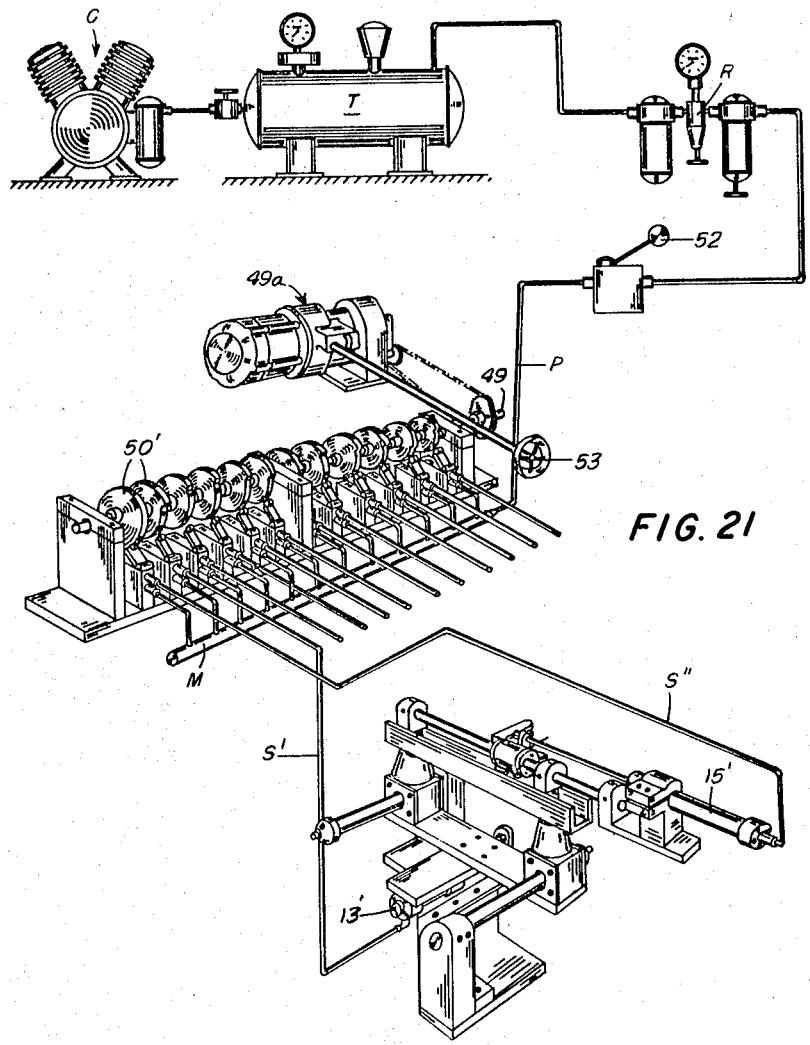
Figure 22:
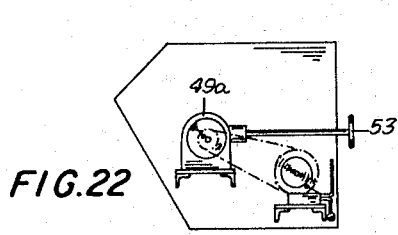
Figure 23:
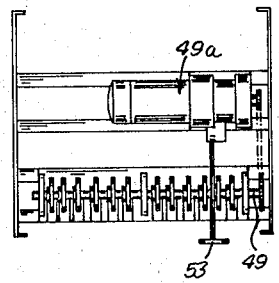

FIG. 4 shows a side view of the two plastic strips according to FIGS. 2 and 3 after being placed upon each other in the form in which they are fed into the machine, FIG. 5 shows a perspective view of a Christmas tree ball which is provided with an opening in its upper half for the insertion of a hanger, FIG. 6 shows a perspective view of the machine according to the invention, FIG. 7 shows a plan partly in section of the machine according to FIG. 6 taken within a horizontal plane between the two welding dies, FIG. 8 shows a perspective view of a part of the control shaft of the machine with the cam plates thereon, FIG. 9 shows a perspective view of a guide member for feeding the workpieces, FIG. 10 shows a perspective view of the piercing and feeding means, FIG. 11 is a perspective view of the cutting means, FIG. 12 shows a perspective view partly in section and partly broken away of the main gripping device, FIG. 13 shows a perspective view of the second gripping device for feeding the workpieces from the two welding dies to the punching device, FIG. 14 is a side elevation, partly broken away, of the machine omitting some of the elements for the sake of clarity, FIG. 15 is an enlarged view of the welding head 40 partly broken away to show its interior structure, FIG. 16 is a diagrammatic view in elevation showing the feeding of the blanks to the machine, FIG. 17 is a diagrammatic plan view of FIG. 16, FIG. 18 shows in plan the two halves of a workpiece immediately upon welding as it is prior to trimming, FIG. 19 shows the punch in section, FIG. 20 is a plan view of the welded workpiece of FIG. 18 after being trimmed in the punch of FIG. 19, FIG. 21 is a diagrammatic view of the pneumatic circuitry for the machine, FIGS. 22 and 23 are an end view and a plan view, respectively, of a suggested variable speed drive for the machine, and FIG. 24 is a diagrammatic section showing a valve.

FIGURE 1 illustrates a finished Christmas tree ball 1 which is produced according to the invention and consists of an upper half 2 and a lower half 3 which are welded together along a projecting rim 4. FIGURE 1 also shows that ball 1 is provided with a small opening 5 for the purpose of allowing the entry of air for compensating a possible pressure within the ball by venting the internal pressure. The halves 2 and 3 are hemispherical shells which, when joined, provide a spherical hollow body.

In FIGURES 2 and 3 there is shown upper and lower strips 6 and 7, respectively, of plastic which have been provided with, preferably by vacuum forming, a series of projections 2 or depressions 3 which subsequently constitute the upper and lower halves of the balls. The upper strip 6 and the lower strip 7 may be metallized or silvered on their interior or facing surfaces after having been vacuum formed and prior to being fed to the machine. A lubricant is placed between the strips 6 and 7 at the time such strips are positioned in the FIGURE 4 assembly, and it will be noted that the flat sides of the strips are in contact and the strips are thus arranged when fed to the welding machine in the direction denoted by arrow 8. The Christmas tree ornament illustrated in FIGURE 5 is also provided with an opening 2a in its upper half 2 into which a suitable hanger may be inserted.

FIGURE 6 shows a perspective view of the entire welding machine with a feeding guide 9 thereon into which the double plastic strip 6, 7 is placed to be guided thereby into a slotted guide tube 10, which is illustrated on a larger scale in FIGURE 9. As believe readily apparent from the drawings, the double plastic strip 6, 7 is inserted into guide tube 10 in such a manner that the next unit, a feeding device in the form of a transverse support carrying a piercing and conveying device 11 which is the device shown in FIG. 10, will thereby be brought into action. The piercing and conveying device 11 is provided for the following purpose:

By being moved in the direction of arrow 13 by piston and cylinder means 13' in FIGURE 10, a piercing needle 12 carried by the conveying device 11 punches the opening 5 (FIGURE 1) into each upper half 2. The conveying device is also provided with a gripping device 14, 17, 17a which is adapted to enter into the lateral slot in guide tube 10 so as to frictionally grip and feed the strip-shaped workpiece 6, 7 in this guide tube for one spacing in the direction of arrow 15 under the influence of cylinder and piston means 15' toward a cutting device 16 best shown in FIGURES 16 and 17. At the end of guide tube 10 a microswitch (not shown) is provided which is adapted automatically to interrupt the operation of the adjacent cutting device 16 if no workpiece 6, 7 is advanced from guide tube 10. These two units, that is, the conveying device 11 (not shown in FIG. 6) and the cutting device 16, are illustrated in detail in FIGURES 10 and 11, respectively (diagrammatically in FIGURES 16 and 17).

The conveying device including piercing needle 12 and gripping device 14 as shown in FIGURE 10, is pneumatically movable in the direction of arrow 13 by piston and cylinder device 13' and also in the direction of arrow 15 by pneumatic device 15'. The cutting device or shear is likewise pneumatically movable by cylinder and piston means 18' so as to operate in the direction of arrow 18 (FIGURE 11), and near its front end it is provided with a pair of cutting wheels 19 and 20 which are adapted to cut the individual workpieces 6, 7 from the strip as supplied thereto. A gripping device 21 which removes the severed pair of upper and lower workpieces 6 and 7 from the shear 16, as also shown in detail and partly in section in FIGURE 12, then comes into action. This gripping device 21 is movable to the left as indicated by arrow 25 by a cylinder piston unit 26 and in the upward direction of arrow 27 by a rod 28 which is guided by a roller 29 along a cam member 30. Rod 28 is guided within a post 31 which is rigidly secured to a plate 32 which, in turn, is slidable within a housing 33 in a horizontal direction, as shown by arrow 25. This movement is again effected pneumatically by the operation of a piston rod 26'. In order to prevent cam 30 from interfering with the return movement of the gripping device 21 in the direction of arrow 25a the cam 30 may be dis-engaged pneumatically from roller 29 by being shifted laterally by means of a wedge-shaped piston rod end 36 engaging lateral slide member 30' operative by a piston and cylinder 36'. The operation of the gripping device is as follows:

Piston 34' is acted upon by compressed air passing through a line 37 so as to wedge the tips of two clamping fingers 22 and 22a toward each other to grasp the workpieces 6, 7. By the pneumatic actuation of piston rod 26' extending from the cylinder piston unit 26, the plate 32 is moved in the direction of arrow 25 while the rod 28 is moved upwardly at the same time in the direction of arrow 27 since roller 29 rolls upwardly along cam 30. The movement of the gripping device in the direction of arrow 25 continues until it has carried the workpieces 6, 7 to the next stage and upon rolling off of the end of cam 30 has deposited the workpiece 7 in a lower welding die 41 and clamping fingers 24, 22 adapted to leave workpiece 7 in the lower die 41. All units of the machine which are pneumatically operated in one direction of movement will be returned individually by spring action to their original positions.

After the gripping device 21 has completed its operation, the operation of a main welding unit 39 begins in which the welding process is carried out. As illustrated in FIGURES 6 and 7, the welding unit 39 consists of an upper welding die 40 and the lower die 41. This lower die is provided with a slip clutch 42 shown in FIGURE 14 which holds the lower die stationary at a very accurately adjusted torsion setting. The welding process is carried out according to the principle that the two hemispherical shells 2 and 3 are welded together by means of pressure and frictional heat, whereby the thermoplastic material is softened to such an extent that the engaging surfaces of the two shells are automatically welded together. One of the difficulties involved in carrying out this process successfully consists in accurately determining the values and dimensions of each individual component of the apparatus and in associating their functions with each other so as to attain the desired result. Thus, for example, if the pressure which is exerted by the upper die 40 upon the lower die 41 and the intermediate workpiece is too strong, the rims of the shells will be too highly compressed and be pressed through entirely. If, on the other hand, the pressure is too low the two strips of the workpiece will not be properly welded together since the friction produced by the relative rotation of the two strips in engagement with each other does not result in a sufficiently high heating of these strips to melt them together. This difficulty is preferably overcome according to the invention by making annular contact surfaces 40a and 41a of dies 40 and 41 which weld the two strips of each workpiece together of a serrated shape. After the two strips 6 and 7 are properly heated by friction they will then be more securely welded to each other since the individual serrations of the welded rims caused by pressure of serrated surface 40a and 41a will interengage with each other and thus adhere more firmly to each other. Naturally, this requires that both the rotative speed of the upper die and thus the relative speed of the two strips to be welded together as well as the contact pressure between them are made of the proper values and are very accurately coordinated with each other. This is carried out by first inserting the two strips 6 and 7 into the welding unit 29, then gripping the upper strip 6 by means of the upper die 40 which rotates at a high speed, and then pressing the rotating upper strip 6 upon the fixed lower strip 7 so as to produce a high friction between the two strips. The frictional heat which is thus generated then fuses the two strips 6 and 7 to each other. This fusion, however, will not occur properly unless a lubricating fluid, for example silicon oil, is applied in the form of a thin coating upon the contact surface of one or the other strip 6 or 7. This coating, so to speak, acts as a welding inhibitor until the entire surfaces are uniformly heated by friction so as to weld together uniformly at all points thereof.

A further provision for the proper operation of the welding process is that the lower die 41 of the welding unit 39 is provided with the overload release clutch 42 which is very accurately adjusted to hold the lower die 41 against rotation with such a torsional resistance that the clutch 42 will not release die 41 until the upper and lower strips 6 and 7 adhere to each other sufficiently and are partly welded to each other to such an extent that the lower die pulled by the adhesion between the two strips of the workpiece will overcome the retaining action of the slip clutch and be rotated by the rotation of the upper die. As soon as this occurs the final welding action takes place under the pressure of the upper die against the lower die so that the two strips will be uniformly welded at all points along and between their rims. The release clutch 42 is of any known type (see Class 192, subclass 032) designed to permit it to be readily adjusted. The adjustment selected depends primarily upon the type and thickness of the plastic material to be welded.

After the welding process has been completed, the upper die 40 is retracted and a further gripping device 43, as illustrated in detail in FIGURE 13, is actuated to grip the welded workpiece 6, 7 to lift the workpiece out of the lower die 41 and carry the same along an arcuate path to a punch 44. This movement of the gripping device 43 is likewise produced pneumatically, namely, by means of a pneumatically operated piston rod 45 which pivots a lever 46 about the axis of a rod 47 and thereby turns the same together with a gripping member 43a, which may be a duplicate of the gripping member 21, thereon and the welded workpiece held by this gripping member to deposit the workpiece in the punch 44. The welded workpiece 6, 7 is then automatically punched out in punch 44 to the desired size of its welded rim to leave a stamped-out web or scrap, and the web is thereafter ejected from the punch by compressed air or a mechanical ejector or by both. By this ejection the finished ball 1 or similar hollow article is separated from the stamped-out web, and the finished ball 1 is thereby also deposited in one container 48, while the stamped-out scrap is deposited elsewhere as may be convenient.

The operation of the machine is illustrated in FIGURES 11–20. In FIGURE 16 the assembled strips, as shown in FIGURE 4, are seen entering the machine from the right. Gripping device 17a, 17b is seen positioning the strip so that shears 16 can sever the pair of workpieces 6, 7 that are held by the gripping device 21.

In FIGURE 17 the gripping device is carrying the workpieces 6, 7 that have been severed, in the direction 25, to the welding dies 40, 41.

FIGURE 15 shows the welding die 40 in some detail. The lower die 41 is simply a cup into which workpiece 7 engages and by which the workpiece is frictionally held against relative rotation. Upper die 40 comprises a rim portion 40A and a cup portion 40B. The cup portion is of resilient material, and is not the exact shape of the half 2 of the workpiece 6. For the hemispherical workpiece shown, for instance, the resilient material 40B is formed with a cavity that is slightly shallower than the hemisphere so that, as the die 40 is lifted after completion of the welding operation, the workpiece will be pushed out of the die. The edge of the rim 40A of die 40 is shown as being radially corrugated or serrated as at 40a as discussed above.

FIGURE 14 shows the means by which die 40 is rotated and is raised and lowered. A cylinder 40c operates through any suitable mechanism to raise and lower the die 40. The specific rack and pinion means is shown merely as illustrating one means. The speed of rotation of the die 40 may be varied, as shown in FIGURE 14, by stepped pulleys as shown, or by any other known means.

When the welding operation is complete the workpieces will have the appearance seen in FIGURE 18. Surrounding the body of the "ball" there is a band of weld, and beyond the welded area will be unwelded portions. The gripping member or tongs 43a, seen in FIGURE 13, grasp the unwelded portions and lift the workpieces 6, 7 and convey the same to the punch seen in section in FIGURE 19. The lower part of the workpiece (half 3) is deposited in a cup of resiliently depressible element 110. Male punch element 109 descends and engages the welded portion of the workpiece closely about the body of the workpiece. Element 109 has an exterior peripheral shape that is the same as the interior shape of female punch element 112 so that as the male element 109 descends into element 112 the flange of the weld is severed. A completed ball is seen in plan in FIGURE 20 where it is noted that a tab 107 is provided with an aperture 117. To form this tab and aperture the lower die is provided with an upstanding male punch element 115 which extends through a bore 114 formed in the resiliently depressible element 110. The male punch element 109 is also formed with a bore 116 in alignment with the bore 114 for receiving the end of the punch element 115 when such element is displaced for forming aperture 117 in the flange of each ball. Element 118 is a knockout to lift the ball from the punch. Element 111 is a hold-down to assure that the discarded portion of the workpiece will be completely separated from the workpiece, and element 119 is an air nozzle to provide a jet of air at high velocity to lift the finished ball over to the container 48 which is seen in FIGURES 6 and 7.

Valves 50 may be spool valves as seen in FIGURE 24 arranged to connect the air pipes leading to the several cylinders to air pressure manifold M, or to vent the cylinders. Each piston is returned to its normal or inactive position by a spring so that it is only necessary to connect the cylinder to be operated to the pressure line to activate the piston so the piston will move to the end of its stroke and remain in the extended position until the valve 50 associated with that particular cylinder is vented, whereupon the piston is pushed back into the cylinder by its spring. Each cam disc 50' is mounted on shaft 49 so that the cam will open its associated valve at the proper time in the time sequence of the operating cycle which is performed as shaft 49 rotates one revolution.

It will be noted that several of the pistons are activated at approximately the same time. It is necessary that the punch 44 be empty before a workpiece is placed therein and the same is true of the lower die. It will therefore be understood that several workpieces are in the machine and are being operated on simultaneously, but at different stages of their production.

The entire cycle of operation is dependent for timing on the time required for the weld to be effected which may be reguated to a degree by the speed of rotation of the upper die 40. Diagrammatically the stepped pulleys seen in FIGURE 14 provide such speed change.

By providing a variable speed motor 49a to drive the shaft 49, further refinement in the timing can be effected. The mounting of motor 49a is shown in FIGURES 22 and 23. Other known mountings and variable speed devices may be used, of course, in lieu of those shown.

In FIGURE 21 a compressor is provided to maintain a constant presure in tank T shown at the top of the figure. Moisture, oil and dirt traps, and a reducing valve R are shown through which the air supply is led by pipe P to the manifold M. From manifold M connections are made to each of the valves 50, as seen in FIGURE 24, and from each valve 50 a service connection S leads to one of the pneumatic cylinders. In FIGURE 21 a line S' is shown connected to cylinder 13' and a line S" is shown connected to cylinder 15' (also see FIGURE 10).

As seen in FIGURE 24, when the cam follower of the valve 50 comes opposite a depression in the cam 50' the valve spood will move to the position shown in FIGURE 24. However, when the cam again depresses the cam follower, which pushes on the valve spool, the top of the valve spool is pushed past the end of pipe S so that pipe S is vented to atmosphere. This valve is shown not as being novel per se, but merely to illustrate an operative valve for use in the combination.

The machine according to the invention, for automatically welding and punching out the desired hollow articles, for example Christmas tree balls, therefore consists principally of an upper part I and a lower part II. The upper part I contains a headstock which carries the upper die 40 mounted on a coaxial shaft or spindle 40b and is adapted to be adjusted to rotate at different speeds. The spindle, together with the upper die 40 thereon, is movable upwardly and downwardly at regular, but adjustable, intervals. The lower part II of the machine consists of a box-shaped housing which supports all of the electrically driven, pneumatic elements; that is, the feeding guide 9, the slotted guide tube 10, the piercing and conveying device 11, the cutting device 16, the main gripping device 21, the lower die 41 of the welding apparatus, the second gripping device 43, and the punch 44 with the ejectors and containers 48. All of the operations and functions of the various movable parts of the machine are controlled by the single cam shaft 49, as illustrated in FIGURES 8, 14, and 21-24, which carries a plurality of cams 50' which are operatively associated with valves 50 seen in one form in FIGURE 24 These valves, in turn, control the pneumatic cylinders. For supervising the operation, the front side of the machine has a control panel 51 on which a pneumatic control knob 52 is provided. It is possible to adjust the speed of operation of the valves from the outside without requiring the housing of the machine to be opened.

This control panel also contains control knobs for starting and stopping the electric motors and to drive the cam shaft and to drive the die 40.

Camshaft 49 is driven by a geared motor preferably through a chain gear. Near this motor and preferably on the rear side of the machine a control wheel (FIGURE 21) is provided which permits by left or right turns an adjustment of all valves in accordance with the length of time required by the individual operating steps. Since all valves operate in a timed relation to each other, a simple turn on control wheel 53 toward the right or left suffices to increase or decrease the speed of operation of all valves.

For insuring the safety of operation of the machine, the same may be equipped with photo-electric cells 54 and 55, as indicated in FIGURE 7, which prevent the operation of the welding and punching apparatus if the workpieces 6, 7 are for any reason not properly conveyed.

The automatic machine according to the invention is adapted to weld and punch out any type of hollow article, regardless of whether the article is spherical, elliptical or of any other configuration provided the rims or welding edges of the articles are circular. By providing two or more gripping devices in series with each other, practically any kind of workpiece may be carried from one place to any other desired place. According to the present embodiment of the invention, two gripping devices which are operated successively are utilized for picking up a pair of hemispherical shells at one feed station, inserting them into a welding tool, removing the welded ball from this tool, and inserting the ball into a punch. All of these movements are likewise controlled by pneumatic means by the operation of a camshaft and roller-operated lever valves. This gripping device may also be applied, for example, for conveying individual workpieces to certain tools or to certain stations in a production line in various kinds of industries.

Although my invention has been illustrated and described with reference to the preferred embodiments thereof, I wish to have it understood that it is in no way limited to the details of such embodiments but is capable of nu-

What is claimed is:

1. A machine for making hollow bodies from a workpiece defined by upper and lower substantially planar strips of thermoplastic synthetic material having a series of axially spaced complementary opposed cup-shaped portions jointly providing a series of axially spaced hollow bodies, comprising a supporting surface, a guide means on said supporting surface to which the workpiece is fed, cutting means on said supporting surface operably related to said guide means, means on said supporting surface for moving the workpiece from the guide means to the cutting means for cutting the workpiece transversely between adjacent cup-shaped portions, welding means in proximity to said cutting means including a lower die carried by said supporting surface, an upper die, means mounting said upper die for movement toward and away from said lower die, and means for effecting relative rotation between said upper and lower dies, means on said supporting surface for conveying a cut section of said workpiece to said lower die so that upon movement of the upper die into operative relationship to the lower die and upon relative rotation being effected between said upper and lower dies, the area of each strip surrounding said cup-shaped portions will be heated frictionally to provide a weld therebetween and join said cup-shaped portions to form a hollow body, a punch on said supporting surface, means on said supporting surface for removing the workpiece section from the lower die for positioning such section on said punch whereby upon actuation of said punch, said punch removes the unwelded material of the workpiece section, and means for discharging said removed unwelded material for providing a completed hollow body.

2. The machine for making hollow bodies as claimed in claim 1 in which said upper die is provided with cushioning means having a contour adapted to receive the cup-shaped portions on the upper strip of said workpiece.

3. The machne for makng hollow bodies as claimed in claim 1 including torque limiting clutch means operably related to said lower die and said upper and lower dies being provided with serrated annular opposing surfaces adapted to engage the portions of the strips surrounding the cup-shaped portions.

4. A machine for making hollow bodies from a workpiece defined by upper and lower strips of thermoplastic mateiral having a series of axially spaced complementary opposed cup-shaped portions jointly providing a series of axially spaced hollow bodies, comprising a supporting surface, a guide means on said supporting surface to which the workpiece is fed, cutting means on said supporting surface in operative relation to said guide means, conveying means on said supporting surface including a first pair of pivotal clamping jaws for gripping said workpiece and moving the same from the guide means to said cutting means for severing the workpiece transversely between opposed cup-shaped portions, welding means in proximity to said cutting means including a lower die carried by said supporting surface, an upper die, means mounting the upper die for movement toward and away from the lower die, and means for rotating said upper die relative to said lower die, gripping means including clamping jaws for moving a severed section of the workpiece to the lower die, means for opening said last-named clamping jaws for releasing said severed section into said lower die so that upon movement of the upper die into operative relationship to the lower die and upon rotation of said upper die, the portions of the strips surrounding the cup-shaped portions will be heated frictionally to provide a weld therebetween and join the cup-shaped portions to form a hollow body, a punch on said supporting surface, additional gripping means on said supporting surface for grasping and positioning said section on said punch so that upon actuation of the punch the punch removes the unwelded material of the section, and further means for discharging said unwelded material from the machine.

5. The machine for making hollow bodies as claimed in claim 4 in which said upper die is provided with cushioning means having a contour adapted to receive the cup-shaped portions of said upper strip.

References Cited by the Examiner
UNITED STATES PATENTS

| | | | |
|---|---|---|---|
| 2,679,090 | 5/1954 | Farr | 156—73 |
| 2,853,118 | 9/1958 | Schnitzius | 156—423 |
| 2,933,428 | 4/1960 | Mueller | 156—73 |
| 2,956,611 | 10/1960 | Jendrisak et al. | 156—73 |
| 3,064,715 | 11/1962 | Bland | 156—556 |
| 3,078,912 | 2/1963 | Hitzelberger | 156—556 |

EARL M. BERGERT, *Primary Examiner.*

P. DIER, *Assistant Examiner.*